United States Patent [19]
Wendling et al.

[11] Patent Number: 5,970,892
[45] Date of Patent: Oct. 26, 1999

[54] TRASH CLEANING STRUCTURE FOR A FURROW OPENING DEVICE

[75] Inventors: Ignatz Wendling, Bettendorf, Iowa; Lyle Eugene Stephens, Hampton, Ill.

[73] Assignee: Deere & Company, Moline, Ill.

[21] Appl. No.: 08/965,205

[22] Filed: Nov. 6, 1997

Related U.S. Application Data

[63] Continuation-in-part of application No. 08/902,761, Jul. 30, 1997, Pat. No. 5,878,678.

[51] Int. Cl.$^6$ .................................................. A01B 49/04
[52] U.S. Cl. .......................... 111/139; 111/157; 111/143; 172/624.5; 172/604
[58] Field of Search ........................... 111/139–143, 923, 111/921, 157, 62; 172/604, 624.5

[56] References Cited

U.S. PATENT DOCUMENTS

| | | | |
|---|---|---|---|
| 5,076,180 | 12/1991 | Schneider | 111/139 |
| 5,095,832 | 3/1992 | Rumbaugh | 111/193 |
| 5,152,349 | 10/1992 | Roden | 111/139 X |
| 5,255,617 | 10/1993 | Williams et al. | 111/140 |
| 5,279,236 | 1/1994 | Truax | 111/139 |
| 5,341,754 | 8/1994 | Winterton | 111/139 |
| 5,349,911 | 9/1994 | Holst et al. | 111/139 |
| 5,461,995 | 10/1995 | Winterton | 111/139 |
| 5,555,825 | 9/1996 | Geddes | 111/62 X |
| 5,657,707 | 8/1997 | Dresher et al. | 111/139 |
| 5,660,126 | 8/1997 | Freed et al. | 111/139 X |

*Primary Examiner*—Victor Batson

[57] ABSTRACT

A shallow-toothed clearing disk pivotally supported from the upper end of the opener drawbar assembly. A four bar linkage is connected to the forward end of the drawbar by a bracket which includes at least one link and corresponding pivot structure located above the drawbar to increase trash clearance and reduce trash build-up. The shallow rounded gullets between pointed teeth provide good disk depth control and trash penetration while reducing soil penetration and soil disturbance. The gullets also hold and prevent sliding of trash away from the clearing influence of the angled disk. The disk effectively clears trash to the side of the opener opposite the gauge wheel to assure optimum depth gauging for the opener. The gear-type structure is capable of operating over a wide range of down pressures and loads while breaking any existing crust in the cleared path with little soil disturbance. The disk provides minimum tillage with little soil and trash throw to assure uniform planting depth, seed germination and plant growth without stimulation of weed growth, both in the row being cleared and in adjacent rows.

16 Claims, 4 Drawing Sheets

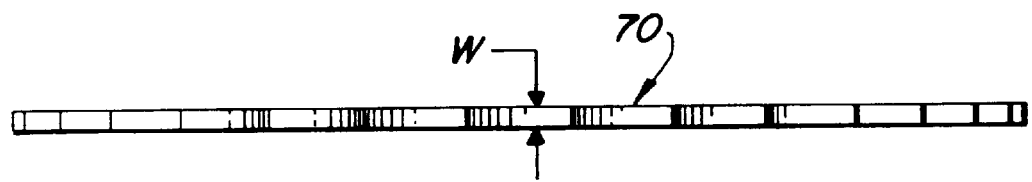
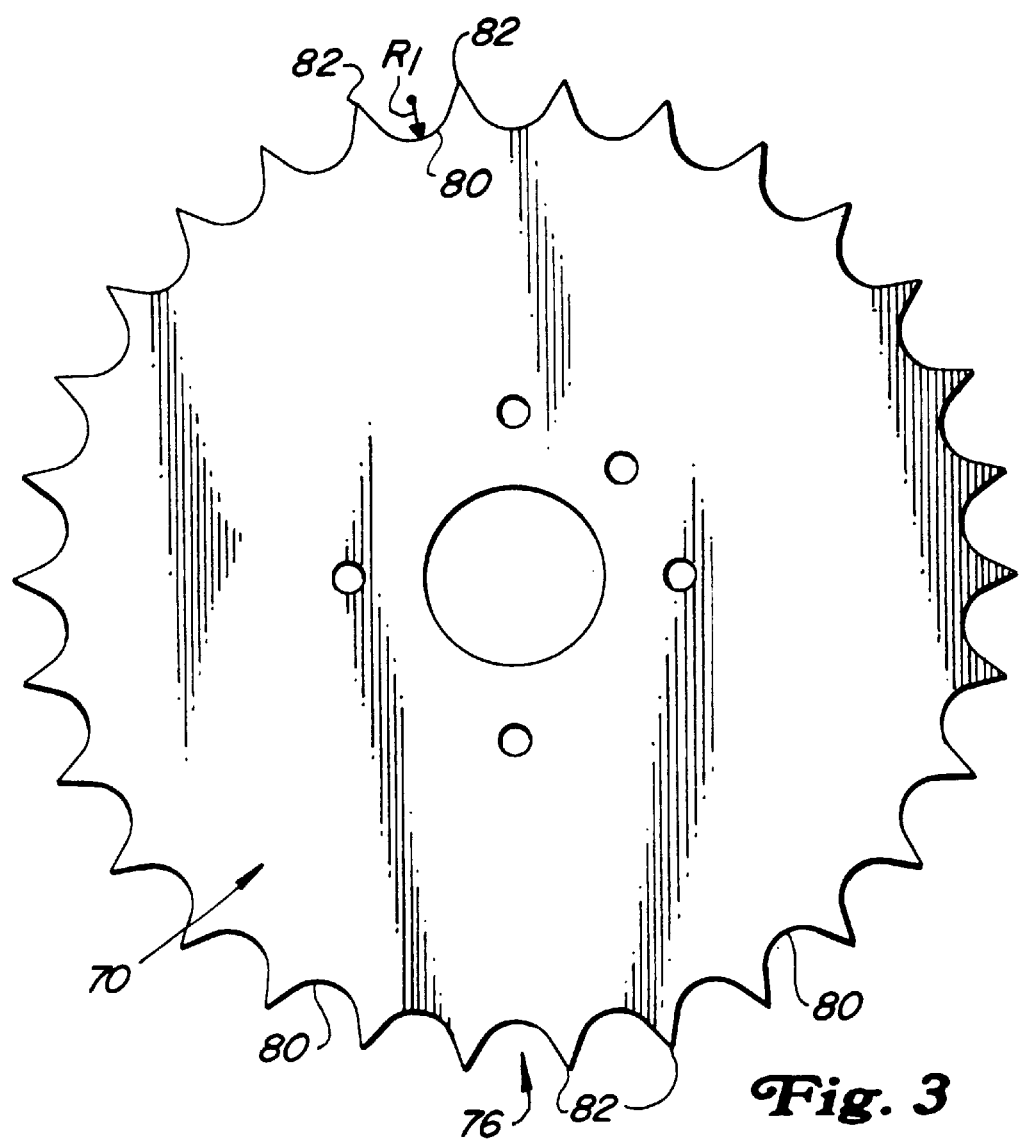

TRASH CLEANING STRUCTURE FOR A FURROW OPENING DEVICE

CROSS-REFERENCE OF THE INVENTION

This is a Continuation-In-Part of application Ser. No. 08/902,761 filed Jul. 30, 1997 now U.S. Pat. No. 5,878,678 issued Mar. 9, 1999.

BACKGROUND OF THE INVENTION

1) Field of the Invention

The present invention relates generally to agricultural implements and, more specifically, to structure for clearing trash from a narrow area ahead of an opener or similar earthworking tool and for breaking surface crust on soil during planting.

2) Related Art

During planting operations, residue such as wheat straw or corn stalks is often encountered by the furrow opening device on the seeding implement. If the soil is soft or the residue is very tough, much residue is pushed into the seed trench. The residue prevents seed from contacting soil and reduces the opportunity for seed germination and healthy initial plant growth. In heavy residue conditions, trash remaining over the seed or thrown over the furrow by an adjacent device can block sunlight and hinder or even prevent growth of the new plant. Often, a surface crust needs to be broken during planting to assure good emergence, but soil throw must be kept to a minimum to avoid piling too much trash over rows previously planted by trailing openers, to avoid weed emergence problems, and to help keep seed coverage more uniform from row to row.

Different cleaning wheel devices are available including those with long or spoked teeth wheels steered relative to the forward direction to move trash to the side of the row. In certain kinds of straw such as encountered in wheat fields, the straw slips between the teeth and fails to be swept to the side of the row. At times, the straw tends to wrap around the wheel. Depth control is also very erratic with the long tooth design, and the wheel can dig in when soil is loose and ride to high in hard ground conditions. Excessive tillage and soil throw are common with long or spoked teeth, and excessive movement of soil away from one furrow and piling of trash and some additional soil over an adjacent furrow, particularly if high speed planting is attempted, results in less than ideal germination and initial growth of the seeds placed in the furrows. The planting speed of the planting unit can actually be limited by the cleaning wheel structure.

Mounting a cleaning device in the limited space available adjacent an opener has been a source of several problems. Fixed cleaning arrangements which are connected directly to the opener assembly or frame without provision for independent movement are subject to damage if obstacles or other large ground surface irregularities are encountered, and the location of the cleaning device relative to the opener can change detrimentally as the opener follows the ground contour. Pivoting arrangements often fail to track well, and if the cleaning wheel structure is supported closely adjacent the disk opener, the structure can actually hit the opener. Moving the cleaning structure farther ahead of the wheel to avoid interference requires more room than often is available, and as the cleaning wheels are moved ahead there is less holding of the trash close to the soil entry point of the disk so trash hairpins more easily at the disk edge. Supporting the cleaning device in a limited space and providing effective operation without nose-diving or bulldozing of soil during operation have continued to present problems.

A typical cleaning wheel is angled from the forward direction and presents high side loads on the supporting arrangement. If a pivoting arrangement is provided, the high side loads often cause premature bearing failure and can cause the support linkages to bind so good depth control and tracking are lost. The linkages can actually be bent under certain conditions. Providing good side load support for proper pivoting action and long bearing life, without widening the planting unit to the point where narrow row spacings are not available, has been a continuing problem. Clearance under the unit has also been limited by support brackets which project downwardly and catch straw and other debris.

BRIEF SUMMARY OF THE INVENTION

It is therefore an object of the present invention to provide an improved row cleaning structure for an opener or similar implement. It is a further object to provide such a structure which overcomes most or all of the aforementioned problems.

It is a further object of the present invention to provide a row cleaning structure having substantially improved tracking compared to previously available structures.

It is another object of the present invention to provide a row cleaning structure with an improved cleaning wheel. It is a further object to provide such a structure wherein the wheel penetrates trash well without causing excessive soil throw, even at relatively high operating speeds.

It is yet another object to provide a row cleaning structure with a cleaning wheel that effectively moves most types of straw away from a narrow area. It is another object to provide a wheel for such a structure that is supported at an angle to the forward direction to move straw laterally and has a tooth structure that prevents straw from slipping relative to the wheel. It is another object to provide such a wheel for a row cleaning structure that penetrates the straw layer well but does not cause over-tillage, excessive soil and trash throw or straw wrapping. It is still another object to provide such a wheel that is capable of carrying a wide range of loads with good trash movement and little soil disturbance.

It is another object of the invention to provide a improved cleaning structure for clearing a narrow strip of ground ahead of an opener or similar tool. It is a further object to provide such structure which effectively moves most types of straw from the strip without throwing the straw over a previously planted row.

A cleaning structure constructed in accordance with the teachings of the present invention includes a shallow-toothed, planar clearing disk supported by a four-bar linkage from the upper end of the opener drawbar assembly. The four bar linkage is connected by a bracket which includes at least one link and corresponding pivot structure located above the drawbar to increase trash clearance and eliminate trash build-up. The linkage has a virtual center located close to the front of the center of the opener for good tracking and for permitting the clearing disk to be located closely adjacent to the opener disk without interference and excessive forces when the disk encounters obstacles. The clearing disk can rock vertically to follow ground contour and prevent excessive digging and movement of soil. The disk is angled with respect to the forward direction to clear trash to one side of the row, preferably the side opposite the depth control wheel for the opener. The disk is also angled with respect to the vertical to increase transport height and reduce upward throw of soil and trash.

The shallow disk teeth provide better cleaning structure depth control and reduce soil penetration and soil disturbance compared to most previously available cleaning wheels. The shape of the teeth allows good trash penetration, while shallow rounded gullets between the teeth pin trash and prevent sliding of trash away from the clearing influence of the angled disk. Little or no straw is pressed into the furrow so that seed contact with the soil is maximized. The disk effectively clears trash to the side of the opener opposite the gauge wheel to assure optimum depth gauging for the opener. The gear-type structure is capable of operating over a wide range of down pressures and loads while breaking any existing crust in the cleared path with little soil disturbance. The minimum tillage with little soil displacement assures more uniform planting depth, both in the row being cleared and in any adjacent trailing rows. There is less tendency for straw to wrap with the above-described shallow gullet structure.

These and other objects, features and advantages of the present invention will become apparent to one skilled in the art upon reading the following detailed description in view of the drawings.

BRIEF DESCRIPTION OF THE DRAWINGS

FIG. 3. Is a side view of the cleaning disk of the opener assembly of FIG. 1.

FIG. 4 is an edgewise view of the disk of FIG. 3.

DETAILED DESCRIPTION OF THE DRAWINGS

Figure 1:
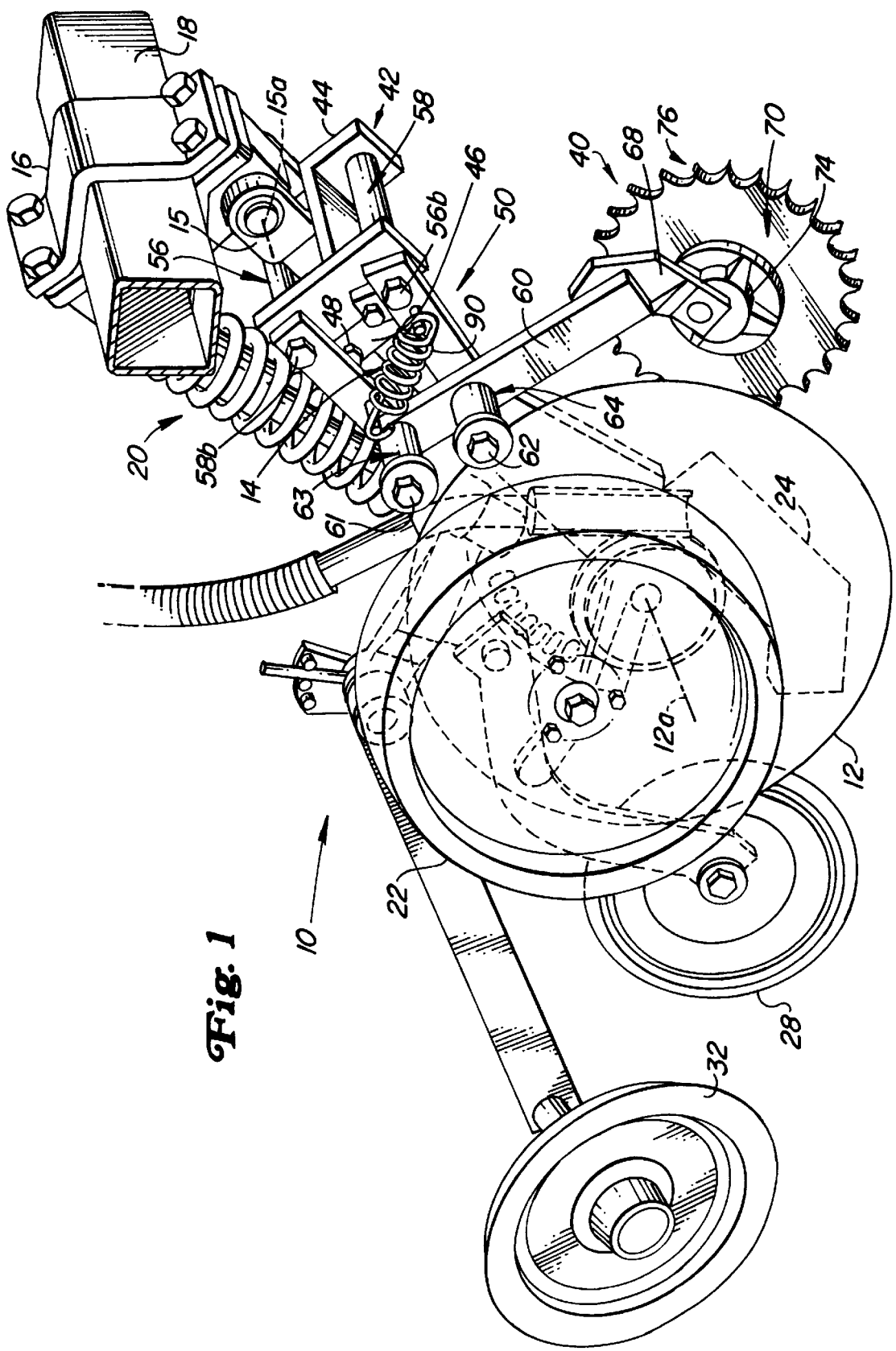
FIG.1 is a front perspective view of an opener assembly with a row cleaning attachment.

Referring now to FIG. 1, therein is shown an opener assembly 10 of the type commercially available on the John Deere model 750 No-Till Drill. The opener assembly 10 includes an opener, shown as a single disk 12, which is supported at an angle with respect to the forward direction for rotation about an axis 12*a* by an arm assembly 14 and which opens a furrow for receiving seed. The arm assembly 14 includes a bifurcated upper forward end 15 pivotally connected by a bracket 16 to a transversely extending toolbar 18 for rocking about a transverse axis 15*a*. A spring assembly 20 connected between the bracket 16 and the lower end of the arm assembly 14 provides downward bias for the opener disk 12. A gauge wheel 22 mounted next to the leading side of the angled disk 12 gauges the depth of the disk and firms the furrow wall. Seed is directed into the furrow by a seed boot assembly 24 supported from the arm assembly 14 in the shadow of the disk 12. A press wheel 28 supported from the arm assembly 14 behind the disk helps push the seed into the soil at the bottom of the furrow for good seed-to-soil contact. A closing wheel 32 crumbles soil from the furrow wall and firms soil against the seed without compacting soil directly over the seed.

To clear residue from a narrow path in front of the disk 12 and prevent residue from being pushed into the furrow so seed is detrimentally placed on straw rather than soil, a row cleaning assembly 40 is connected to the opener assembly 10. The assembly 40 includes a bracket 42 having opposite side portions 44 and 45 and a central arm-abutting plate 46. Bolts 48 (FIG. 1) extend through selected apertures 49 in the side portion 44 and the plate 46 to secure the bracket 42 to the of the end 15 for rocking with the arm assembly 14 about the transverse axis 15*a*. The bracket 42 has an upper portion which projects above the arm assembly 14 and a lower portion that projects below the arm assembly. The side portion 45 projects outwardly from the arm assembly 14 in the direction of the gauge wheel side of the opener assembly 10 and is generally aligned in the fore-and-aft direction with the disk 12. The portion 45 defines the forward upright portion of four bar linkage structure, indicated at 50. The linkage structure 50 includes fore-and-aft extending upper and lower links 52 and 54 having forward ends pivotally connected by bushing structures 56 and 58 to the side portion 45. The structures 56 and 58 extend between the side portions 44 and 45 to provide bearing surfaces having substantial transverse dimensions for good resistance to wear and binding as the linkage structure encounters heavy side loads. The bearing structures 56 and 58 include bolts 56*b* and 58*b* (FIG. 1) which clamp the links 52 and 54 to the bushings for pivoting about the axes of the bolts. The forward end of the upper link 52 pivots about an axis located above the forward end 15. The lower link pivots about an axis directly below the forward end 15, and under normal field conditions (FIGS. 1 and 2), only a small portion of the linkage structure 50 is located below the arm assembly 14 for good trash clearance.

An upright member 60 is pivotally connected to the links 52 and 54 by bolts 61 and 62 extending through transversely extended bearing structures 63 and 64 fixed to the member 60 by welding. Bushings 63*a* and 64*a* are rotatably mounted within bushings 63*c* and 64*c*. The bolts 61 and 62 extend through thick washers (FIG. 1) which clamp the bushings 63*a* and 64*a* to the aft ends of the respective links 52 and 54. The bushings 63*a* and 64*a* rotate with the links within the outer bushings 63*c* and 64*c*.

Figure 2:
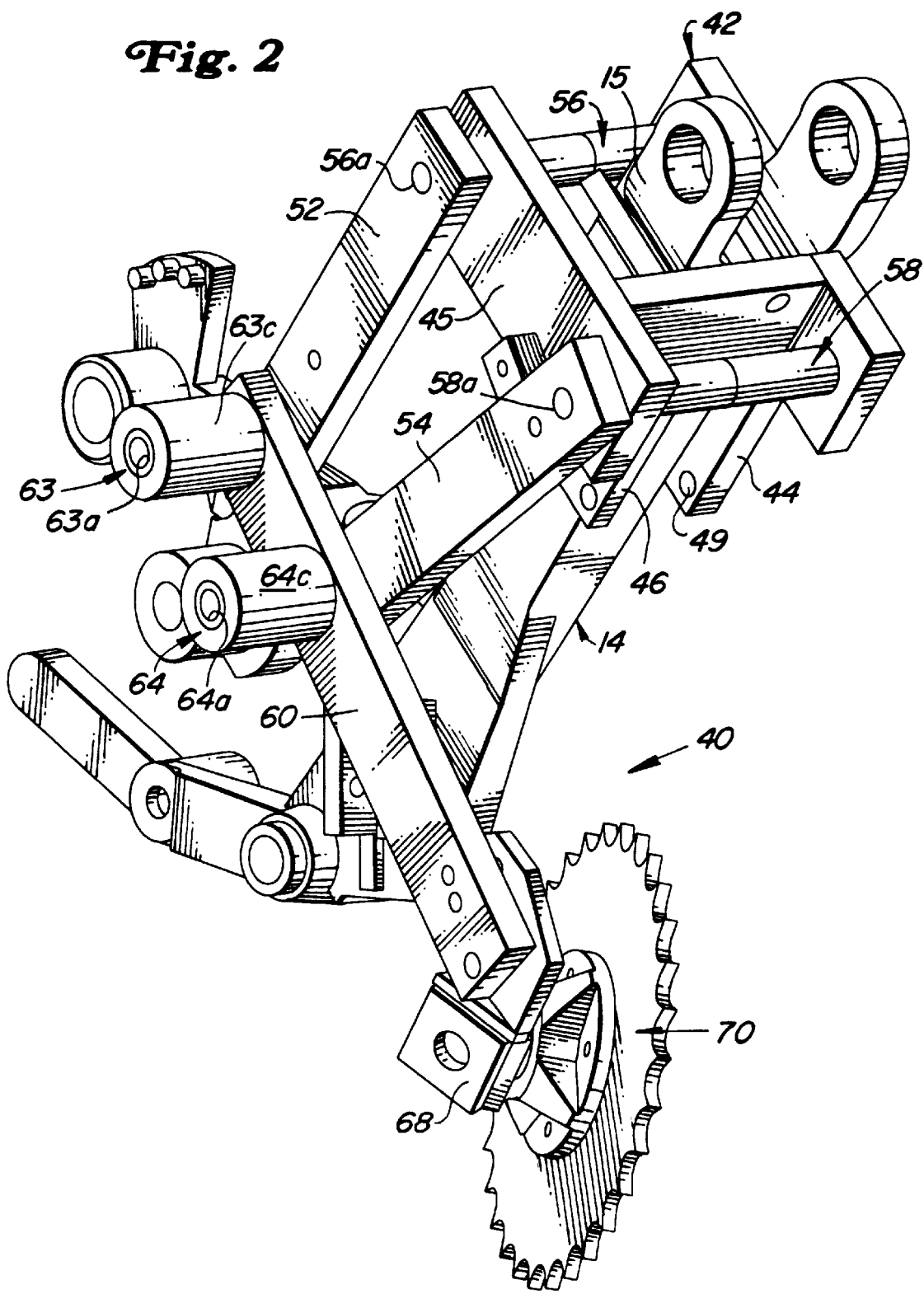
FIG. 2 is an enlarged perspective view of a portion of the assembly of FIG. 1 with parts removed to more clearly show the remaining structure.
Figure 5:
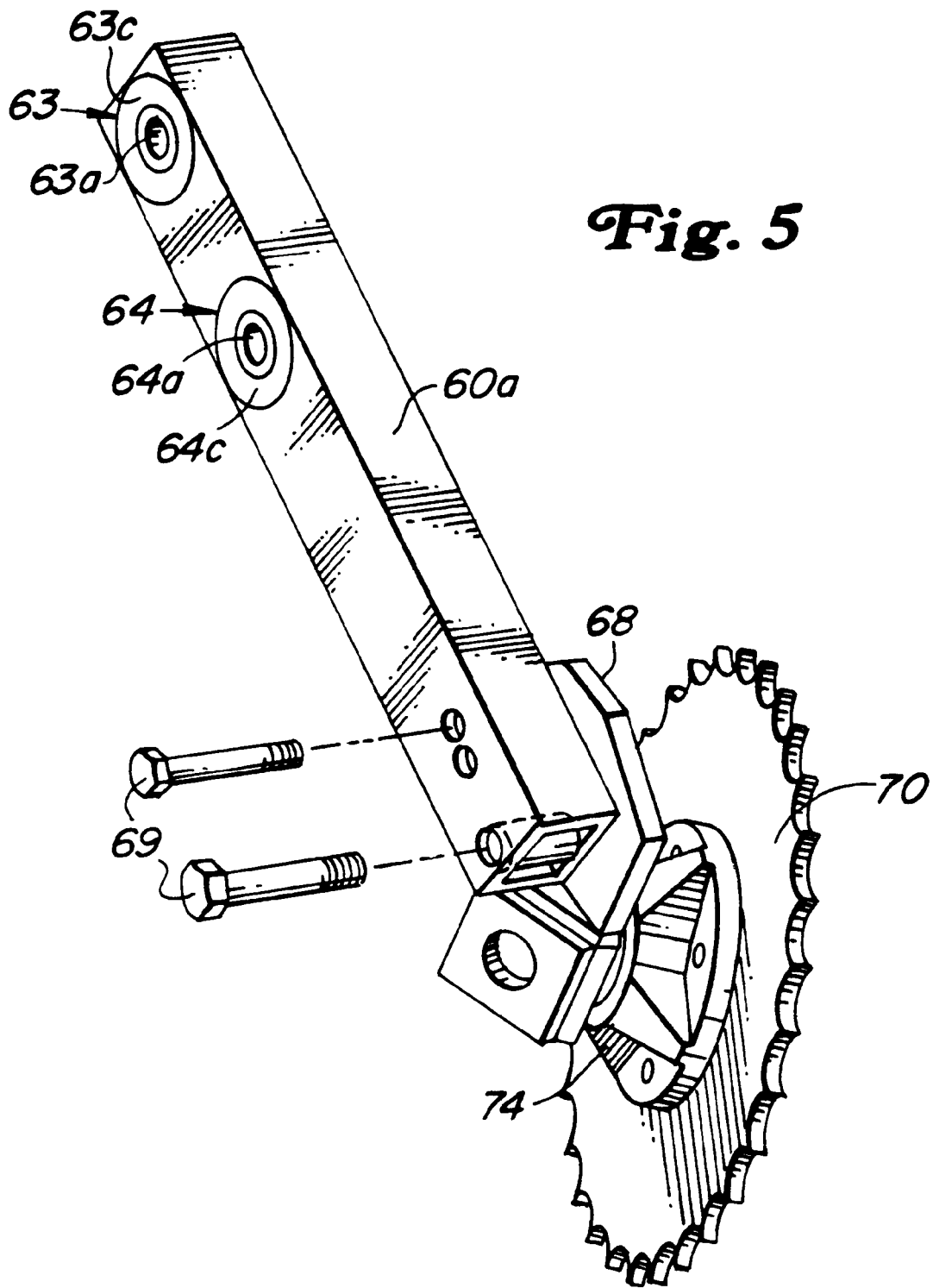
FIG. 5 is a perspective view of an alternate embodiment of a portion of the support linkage for the assembly of FIGS. 1 and 2.

As shown in FIG. 2, the four bar linkage 50 lies generally on one side a fore-and-aft extending plane which passes through the opener 12, and the bearing structures 63 and 64 project outwardly from the plane of the sides of the links 52 and 54 to provide lateral support for the linkage. The laterally extended bearing surfaces increase bearing surface, reduce binding caused by side loads and increase the wear life of the structure. In the alternate embodiment shown in FIG. 5, the link 60*a* is a hollow tubular member of rectangular configuration, and the bearing structures 63 and 64 are supported in the opposite sidewalls of the tubular member.

An angled V-shaped disk support 68 is adjustably supported at the lower end of the member 60 or 60*a* (FIG. 5) by bolts 69. A flat, sprocket-like clearing disk 70 is connected by hub and bearing structure 74 to the support 66 for rotation about an axis angled downwardly and forwardly from the transverse direction. The linkage structure 50 supports the clearing disk 70 with the center of rotation of the disk located ahead of the opener disk 12. The disk support is adjustable relative to the member 60 to vary the angle of the disk 70 relative to the forward direction of travel and relative to the vertical.

The disk 70 is has a diameter of from about eight to twelve inches (20 to 30 cm) and as shown in FIG. 3 is preferably on the order of 10 inches (25 cm) in diameter. The disk 70 has a serrated periphery 76 with a shallow gear tooth or chain wheel type of configuration having rounded gullet areas 80 (FIG. 3) and pointed teeth 82 projecting radially inwardly from the outermost ends of the teeth a distance on the order of a half an inch (1.3 cm). The gullet areas 80 are struck on the arc of a circle having a radius (R1) of about four-tenths of an inch (1.0 cm) with center located between the teeth and radially inwardly from the teeth points about one-eight of an inch (0.3 cm). The disk thickness (W of FIG. 4) is preferably in the range of from one quarter to four-tenths of an inch (0.6 to 1.0 cm) to provide good wear and depth control while retaining effective trash penetration. For a disk diameter of ten inches, approximately thirty teeth 82 are uniformly spaced around the periphery 76.

The configuration of the periphery 76 reduces digging in and soil and trash throw while providing good clearing and trash holding characteristics. The shallow rounded gullets between the teeth pin trash and prevent sliding of trash away from the clearing influence of the angled disk. The teeth 82 easily penetrate trash. Preferably as shown in FIG. 1, the disk 70 is angled toward the seed boot assembly 24 and away from the gauge wheel 22 to most effectively eliminate trash in the path of the gauge wheel to optimize depth control. The disk 70 is angled in the range of about five to forty degrees (preferably about twenty two degrees in the mid-range operating position) from the plane of the forward direction for moving trash away from the row and from zero to thirty-five degrees (preferably above about ten degrees and on the order of seventeen degrees in the operating position) from the vertical to limit upward trash and soil throw and increase clearance for movement into a transport position.

The four bar linkage structure 50 permits the disk 70 to float relative to the toolbar 18 and opener while generally retaining a preselected orientation of the disk relative to the opener to maintain uniform trash pressing and clearing characteristics in the rough field conditions that are often encountered with no-till and minimum tillage practices. The linkage 50 maintains the clearing disks in close proximity to the opener without interference between the opener and clearing disks over a wide range of operating positions. As the disk 12 and arm assembly 14 rock vertically over rough surfaces, the bracket 42 rotates with the arm assembly and moves the disk 70 in the direction which compensates for the movement of the disk 12 and retains the desired relationship between the disk 70 on the opener disk 12. For example, as the disk 12 and arm assembly 14 rock upwardly about the axis 15a, the disk 12 will move through an arc rearwardly relative to the toolbar 18. At the same time, as a result of the rotation of the bracket 42 with the arm assembly 14, the lower end of the upright member 60 will rotate rearwardly so that the clearing disk 70 is maintained in generally constant relationship relative to the entry point of the opener disk 12. As shown, when the opener assembly is in operation, the virtual center of the linkage 50 (that is, the location where the axes of the links 52 and 54 taken through the respective link pivot points intersect) lies forwardly adjacent the axis of rotation (12a) of the disk 12 for good tracking between the disk 12 and clearing disk 70. To reduce excess loading on the linkage when the structure encounters an obstacle such as a rock, the links 52 and 54 are supported at a near parallel condition with the virtual center ahead of the axis 12a, which assures that the disk movement over the obstacle will be substantially vertical with a small rearward component so the disk 70 rolls easily over the obstacle. Since a substantial portion of the linkage structure 50 and the bracket 44 is maintained above the arm assembly 14, trash flow is optimized and locations where trash can catch and build up are minimized. The angle of the arm assembly 14 in the operating position is between twenty and sixty degrees from the horizontal, and preferably about forty-five degrees. Preferably, the links 52 and 54 run substantially parallel to the arm assembly under normal operating conditions.

The bracket 44 supports the linkage structure on one side of the arm assembly 14 and permits rocking of the clearing disk 70 over a wide range of positions relative to the opener without interference between the disk and the opener and opener support structure. The disk 70 tracks the disk 12 well during operation and yet is free to move independently of the disk 12 in rough working conditions. The above-described arrangement also provides adequate clearance to permit the clearing disks to be raised relative to the toolbar 18 to a non-working position for transport with the angle of the disk from the vertical providing additional clearance. As shown in FIG. 1, downward bias of the disk 70 is provided by the weight of the cleaning assembly 40 and by spring bias by adding one or more tension springs 90 between the links 52 and 54. By supporting the spring 90 as shown between the links, a relatively constant down force is maintained over a wide range of vertical travel of the disk 70. A down stop (not shown) limits downward rocking of the row cleaning assembly 40 to a position substantially above an over-center position.

Having described the preferred embodiment, it will become apparent that various modifications can be made without departing from the scope of the invention as defined in the accompanying claims.

We claim:

1. Cleaning structure for clearing trash from a narrow band of ground forwardly of an opener assembly that includes a vertically movable drawbar member having a leading end and a trailing end, the cleaning structure comprising link structure having a forward end connected to the leading end for rocking relative to the drawbar member, and an aft vertically movable end located forwardly of a furrow opening device; clearing disk structure rotatably mounted at the aft vertically movable end at an angle to the forward direction for movement vertically with the trailing end adjacent the furrow opening device, wherein the clearing disk structure includes a disk having a periphery with shallow rounded gullets and trash-penetrating teeth projecting from the gullets, the gullets pressing the trash downwardly as the angle of the disk moves the trash to one side, and wherein the link structure comprises a four bar linkage having a forward portion supported from the forward end of the drawbar member and an aft portion supporting the clearing disk structure, the forward end including at least one pivot located above the drawbar member to provide clearance for the trash below the drawbar member.

2. The cleaning structure as set forth in claim 1 wherein the clearing disk structure comprises a single planar disk, and wherein the linkage supports the disk at an angle in the range of from five degrees to forty degrees from an upright plane extending in the forward direction to move the trash to the one side.

3. The cleaning structure as set forth in claim 1 wherein the linkage supports the disk at an angle in the range of between zero to thirty-five degrees from the vertical, the angle from the vertical reducing upward trash and soil throw by the periphery.

4. The cleaning structure as set forth in claim 1 wherein the furrow opening device includes an opener disk having an axis of rotation, and wherein the four bar linkage defines a virtual center which lies forwardly of the axis of rotation to help the clearing disk ride over obstacles.

5. The cleaning structure as set forth in claim 1 wherein the gullets are rounded and have radii struck on imaginary centers located between adjacent teeth.

6. The cleaning structure as set forth in claim 5 wherein the teeth include pointed ends projecting radially outwardly on the order of half an inch (1.3 cm) from the gullet.

7. The cleaning structure as set forth in claim 1 wherein the four bar linkage lies generally on one side of a fore-and-aft extending plane and includes bearing structure projecting outwardly from the plane to provide lateral support for the linkage and thereby increase bearing surface and reduce binding caused by side loading on the clearing disk structure.

8. Cleaning structure for clearing trash from a narrow band of ground forwardly of an opener assembly that includes a vertically movable drawbar member having a leading end and a trailing end, the cleaning structure comprising a linkage having a forward end connected to the leading end for rocking relative to the drawbar member, and an aft vertically movable end located forwardly of a furrow opening device; clearing disk structure rotatable mounted at the aft vertically movable end at an angle to the forward direction for movement vertically with the trailing end adjacent the furrow opening device, wherein the clearing disk structure includes a disk having a periphery with shallow rounded gullets and trash-penetrating teeth projecting from the gullets, the gullets pressing the trash downwardly as the angle of the disk moves the trash to one side, wherein the linkage structure comprises a bracket connected to the forward end of the drawbar member and movable therewith, and a fore-and-aft extending link pivotally connected at its forward end to the bracket and at its aft end to the clearing disk structure, wherein the link is located at least partially above the drawbar member so that trash clearance under the drawbar is maximized.

9. The cleaning structure as set forth in claim 8 wherein the bracket includes a transversely extending bearing having opposite ends located on opposite sides of the forward end of the drawbar member and wherein the link is offset to one side of the drawbar member.

10. The cleaning structure as set forth in claim 9 wherein the link includes a transversely extending bearing structure extending outwardly from the link and providing lateral support for the linkage structure.

11. Cleaning structure for clearing trash from a narrow band of ground forwardly of and closely adjacent a fore-and-aft extending opener assembly including an opener arm supporting a furrow forming device, the cleaning structure comprising fore-and-aft extending linkage structure having a forward end pivotally connected at a forward pivot area to the opener assembly for vertical movement along side of the opener arm, an aft disk supporting member connected to the aft end of the linkage structure for vertical movement relative to the opener assembly, and a disk connected to the aft disk supporting member and movable vertically therewith, the disk angled with respect to the forward direction to move trash toward one side of the opener assembly, wherein the linkage structure includes an opener side lying closely adjacent the opener arm and an outward side, the linkage structure pivotable vertically along side the opener arm, the disk providing substantial side loads to the linkage as it moves trash to the one side, and a bearing extending outwardly from the outward side of the opener arm and providing transverse bearing surface to resist the side loads, and wherein the pivot area is located above the opener arm to provide clearance for the trash below the opener arm.

12. The cleaning structure as set forth in claim 11 wherein the disk includes a periphery with a chain wheel pointed tooth pattern having tooth ends for penetrating the trash and shallow gullets for holding the trash against the periphery as the disk moves the trash towards the one side.

13. The cleaning structure as set forth in claim 11 wherein the disk overlaps the furrow forming device in the fore-and-aft direction and is angled from the vertical on the order of 10 degrees or more to reduce upward soil and trash throw.

14. The cleaning structure as set forth in claim 11 wherein the linkage structure comprises a four-bar linkage including a pair of links defining a virtual center lying on or close to the furrow forming device, the four bar linkage maintaining the disk generally in a constant attitude relative to the furrow forming device as the disk moves vertically.

15. The cleaning structure as set forth in claim 11 including a forward upright member secured to the forward end of the opener arm and having bearing structure extending through the arm to define the forward pivot area and provide side-load resisting bearing surface.

16. The cleaning structure as set forth in claim 11 wherein the fore-and -aft extending linkage structure comprises a four-bar linkage with upper and lower links and the upper link is located substantially above the opener arm to maintain trash clearance under the arm free of the upper link. disk.

* * * * *